United States Patent [19]
Peterson et al.

[11] Patent Number: 5,641,365
[45] Date of Patent: Jun. 24, 1997

[54] PRE-PRESSURIZED IN-LINE SKATE WHEEL

[75] Inventors: Tom Peterson; Neal Piper, both of Huntington Beach, Calif.

[73] Assignee: The Hyper Corporation, Santa Ana, Calif.

[21] Appl. No.: 595,844

[22] Filed: Feb. 2, 1996

Related U.S. Application Data

[63] Continuation-in-part of Ser. No. 502,828, Jul. 14, 1995, and a continuation-in-part of Ser. No. 354,374, Dec. 12, 1994.

[51] Int. Cl.$^6$ ........................................ A63C 17/22
[52] U.S. Cl. ............... 152/165; 152/325; 152/328; 152/452; 152/511; 152/DIG. 18; 280/11.22; 301/5.3
[58] Field of Search ................... 152/7, 9, 165, 152/166, 325, 329, 327, 328, 324, 326, 320, 322, 452, 302, 344.1, 345.1, 339.1, 333.1, 384, 501, 511, DIG. 18; 301/5.3, 35.51; 280/11.22, 11.23

[56] References Cited

U.S. PATENT DOCUMENTS

| | | |
|---|---|---|
| 988,533 | 4/1911 | Zverina . |
| 1,244,209 | 10/1917 | Hickman ........................ 152/166 |
| 2,570,349 | 10/1951 | Kardhordo . |
| 2,677,906 | 5/1954 | Reed . |
| 2,871,061 | 1/1959 | Behm et al. . |
| 3,121,430 | 2/1964 | O'Reilly . |
| 3,389,922 | 6/1968 | Eastin . |
| 3,469,576 | 9/1969 | Smith et al. . |
| 3,823,293 | 7/1974 | Gilliatt . |
| 3,877,710 | 4/1975 | Nyitrai . |
| 3,937,780 | 2/1976 | Mercier . |
| 4,031,937 | 6/1977 | Georgia et al. .................. 152/323 |
| 4,040,670 | 8/1977 | Williams . |
| 4,183,156 | 1/1980 | Rudy . |
| 4,208,073 | 6/1980 | Hechinger . |
| 4,219,945 | 9/1980 | Rudy . |
| 4,305,212 | 12/1981 | Coomer . |
| 4,361,969 | 12/1982 | Vermonet . |
| 4,379,104 | 4/1983 | Koorevaar .................. 264/45.5 |
| 4,387,071 | 6/1983 | Kirchuff ....................... 264/279.1 |
| 4,445,283 | 5/1984 | Meyers . |
| 4,909,523 | 3/1990 | Olson . |
| 5,028,058 | 7/1991 | Olson . |
| 5,046,267 | 9/1991 | Kilgore et al. . |
| 5,048,848 | 9/1991 | Olson et al. . |
| 5,129,709 | 7/1992 | Klamer . |
| 5,158,767 | 10/1992 | Cohen et al. . |
| 5,253,435 | 10/1993 | Auger et al. . |
| 5,256,350 | 10/1993 | Frazini et al. . |
| 5,257,470 | 11/1993 | Auger et al. . |
| 5,297,349 | 3/1994 | Kilgore . |
| 5,310,250 | 5/1994 | Gonsior . |
| 5,312,844 | 5/1994 | Gonsior et al. . |
| 5,320,418 | 6/1994 | Chen . |
| 5,343,639 | 9/1994 | Kilgore et al. . |
| 5,346,231 | 9/1994 | Ho . |
| 5,351,710 | 10/1994 | Phillips . |
| 5,353,459 | 10/1994 | Potter et al. . |

(List continued on next page.)

*Primary Examiner*—Geoffrey L. Knable
*Attorney, Agent, or Firm*—Fulwider Patton Lee & Utecht, LLP

[57] ABSTRACT

A pre-pressurized in-line skate wheel including a hard polyurethane hub having a drop center formed between radially projecting guide flanges formed with axially projecting windows as spaced equidistant thereabout in an annular array. A bladder device includes a plurality of pressurized hollow cross rods nested at their opposite ends in such windows and surmounting on their radially outward sides a pressurized annular tube arranged concentric with the drop center. A soft polyurethane wheel body is formed in such drop center and projects radially outwardly to encapsulate the annular tube and form an elliptical annular tread surface. The method of manufacturing the tire includes blow molding the cross rods and the annular tube and pressurizing them to the desired individual pressures so that the resultant tire will exhibit the combined benefits of polyurethane cushioning and shock absorption associated with compressible gases.

18 Claims, 8 Drawing Sheets

U.S. PATENT DOCUMENTS

| | | |
|---|---|---|
| 5,353,523 | 10/1994 | Kilgore et al. . |
| 5,362,075 | 11/1994 | Szendel . |
| 5,401,037 | 3/1995 | O'Donnell et al. . |
| 5,406,661 | 4/1995 | Pekar . |
| 5,406,719 | 4/1995 | Potter . |
| 5,416,988 | 5/1995 | Potter et al. . |
| 5,425,184 | 6/1995 | Lyden et al. . |
| 5,441,286 | 8/1995 | Pozzobon . |
| 5,468,140 | 11/1995 | Hoffman et al. . |
| 5,524,913 | 6/1996 | Kulbeck .............................. 280/11.22 |

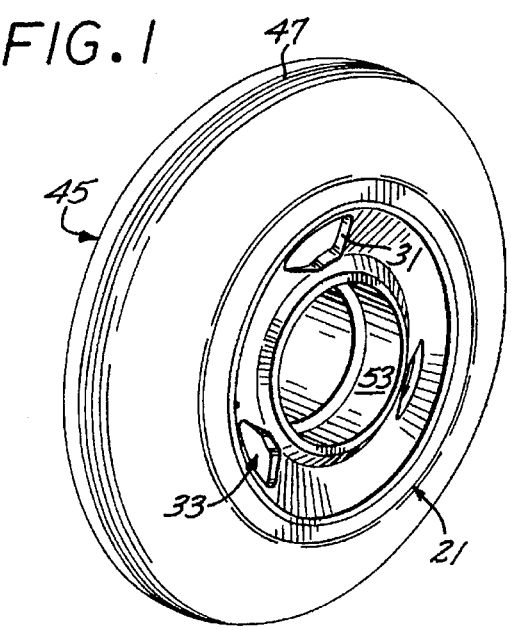
FIG. 1
FIG. 2
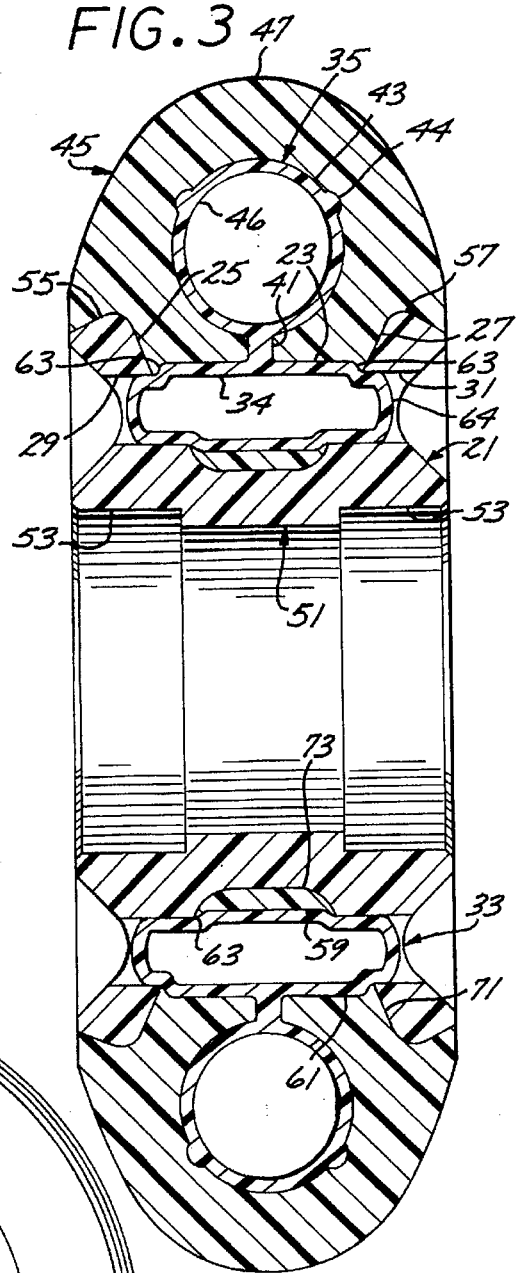
FIG. 3

PRE-PRESSURIZED IN-LINE SKATE WHEEL

This is a continuation-in-part of copending application(s) Ser. No. 08/502,828 filed on Jul. 14, 1995 and 08/354,374 filed on Dec. 12, 1994 and which designated the U.S.

BACKGROUND OF THE INVENTION

1. Field of the Invention

This invention relates to in-line roller skate wheels and more particularly to a prepressurized pneumatic skate wheel of integral construction having an internal bladder network.

2. Description of the Prior Art

Roller skates of various types are well known in the art. Early roller skates typically incorporated four wheels per skate. The wheels for outdoor skating were often constructed of metal and those for indoor, rink skating, of wood. In some early work pneumatic wheel construction was proposed incorporating conventional tire casings lined with a conventional inner tube. A device of this type is disclosed in U.S. Pat. No. 988,533 to Zverina.

With the advent of polyurethane wheel construction, outdoor skating gained great popularity. It was then proposed to mount a plurality of wheels in line on a skate frame so the skater could experience skating maneuvers, similar to that experienced by ice skaters skating on a single blade skate. In-line roller skating has since become a fast growing recreational activity which has developed into a major commercial market in the United States and elsewhere. In-line roller skates allow the skater to negotiate many different surfaces while enjoying the benefits of outdoor activity and cardiovascular exercise.

For recreational activity, in-line skaters often skate on boardwalks, sidewalks and streets, the surfaces of which exhibit bumpy, uneven or rough terrains. The more experienced in-line skaters often become involved in sports, such as in-line hockey, which require more precision and speed. Generally, in-line skate wheels are constructed of hubs surmounted by a tire body of solid polyurethane. Although such wheels are known to provide a relatively smooth ride over many surfaces, the solid tire body is restricted in its ability to cushion and absorb the shock associated with different loads applied due to encounters with irregular support surfaces. Since in-line wheels intended for outdoor use are subjected to numerous different side loads resulting from inclination of the skate during turns and the like, as well as sharp shock loads, the challenges encountered by designers of in-line skate wheels are far different from those encountered by designers of conventional skate wheels.

Although resilience and speed are important characteristics of these in-line skate wheels, the ability to absorb shock is critical for a comfortable ride. An in-line skate wheel that can absorb energy more efficiently while the tire is traversing rocks, gravel or other road hazards, decreases the potential for injury to the skaters legs and knees through shock, as well as creating a smooth and more comfortable ride. In-line skate wheels currently on the market offer reasonable shock absorption depending on the size and resiliency of the wheel. But, because the shock absorption properties are predetermined, the amount of protection a particular wheel provides is limited to those predetermined parameters.

Efforts to solve some of these problems led to the development of a wheel incorporating a hard polyurethane hub having a soft solid polyurethane body formed thereon to provide cushioning. A wheel of this type is disclosed in U.S. Pat. No. 5,312,844 to Gonisor. Wheels of this type have gained acceptance in the market but have some drawbacks. It has been found that solid tire construction foregoes the advantages often associated with the characteristic of pneumatic tires.

A need has remained for a wheel which will combine the benefits of cushioning long associated with a thick body of soft polyurethane with the shock absorption characteristics associated with pneumatic tires. One recently proposed solution to this problem is found in parent U.S. patent application Ser. No. 08/354,374, filed Jan. 12, 1994, and assigned to the assignee of the instant application. This application discloses an in-line skate wheel with an annular, radially encapsulated bladder, inside the skate wheel, the pressure of which can be adjusted by an inflation pump acting through a valve system. Therefore, the skater can adjust the wheels depending on whether increased resiliency is required or increased performance. This wheel provides the skater with the enhanced versatility associated with different wheels of different constructions without the expense of purchasing a selection of different wheels. However, this design requires greater skater "involvement" while skating since the skater is required to physically adjust the level of inflation when conditions or performance requirements change. Additionally, there is substantial expense associated with the manufacture of such wheels and the associated inflation pumps. The present invention provides the skater with similar levels of shock absorption along with increased resiliency but does not require the skater to actively adjust the wheel. At the same time, the addition of annularly spaced radial bladder rods serve to orient the bladder during manufacture and also serve to increase the level of shock absorption and resiliency beyond that of the single annular tube structure.

Many types of inflatable bladders are known in the prior art for use in a variety of applications. One field that has shown a high level of bladder development has been in athletic shoes. One such inflatable bladder is found in U.S. Pat. No. 5,406,661 which discloses a preloaded bladder and pump combination which includes a preinflated portion of the bladder system. This patent includes one bladder which is permanently inflated in combination with at least one other chamber that is inflatable at the users convenience. Although this patent discloses a multi-chamber system, the bladders are connected and are designed for use with a pump. The present invention incorporates multi-chamber bladder structure where the chambers are isolated from one another but allow the bladder structure to cooperate in carrying and distributing shock loads.

Thus, there remains a need for a pneumatic/polyurethane in-line skate wheel which is economical to manufacture and requires little or no user involvement to maintain its performance level while providing for a long and trouble free life.

SUMMARY OF THE INVENTION

The invention is a pre-pressurized pneumatic in-line skate wheel which provides the skater with a comfortable ride under varying surface conditions with high speed capabilities and increased shock absorbance. The wheel construction of the present invention is relatively inexpensive to manufacture compared to other pneumatic skate wheels. Furthermore, the present invention provides an unique alternative wheel for a variety of skill levels thereby allowing the skater to develop his or her skills on a variety of surfaces having a multitude of different characteristics without the need to change skate wheels or modify the present invention in any manner.

The wheel includes a hard urethane hub formed with a pair of radially projecting side flanges configured to form a drop-center. Surrounding the hub drop-center is a bladder device configured with an annular tube pre-pressurized with a compressible gas. Standing such tube off from the drop center are three equally spaced axially projecting hollow pre-pressurized bladder rods. Radially encapsulating the hub, bladder rod periphery and the annular tube is an elastomeric tire of molten urethane similar to that of the hub but typically somewhat more resilient.

The pre-pressurized annular tube and bladder rods create a tire that is of lighter weight and more consistent performance under varying road conditions. The pre-pressurized tube and bladder rods will provide favorable shock absorption and distribution of loads. Such a tire provides greater resilience at the contact surface to provide for greater effective grip at the contact area between the tire and whatever surface the skater is covering, thereby creating better traction. At the same time, when the skater is traveling over smooth surfaces, the lighter weight tire combined with the shock absorption properties of the wheel, will provide the skater with a continued comfortable ride with less physical stress on the legs. For the recreational skater, the ability to traverse a greater variety of rolling surfaces with a more consistent ride is beneficial and provides for greater skating enjoyment. For a more experienced skater, this wheel will provide a light weight, maneuverable alternative, thereby decreasing fatigue and increasing cardiovascular output.

In one embodiment the rims are formed with through windows aligned with indicator walls defining the axial ends of the bladder rods so the user can periodically monitor the condition of such rods and, if desired, check such rods for loss of pressure, either visually or by pressing on the wall of the respective rod to determine the degree of pressurization.

The wheel of the present invention may be manufactured by blow molding the bladder device to form the walls of the tube and cross rods and maintain them distended as the volumes thereof are compressed by a casting mold to thereby establish the final desired pressure. The tire device may then be mounted on the hub with the opposite axial ends of the cross rods nested in the axial inner ends of the windows to support the annular bladder spaced radially outwardly from the inner wall of the drop center while the molten soft polyurethane is poured into the mold to form the tire body configured in encapsulating relationship about the tube and main body of the respective cross rods.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 1 is a perspective view of a pre-pressurized in-line roller skate wheel embodying the present invention;

FIG. 2 is a side view, in enlarged scale, of the wheel shown in FIG. 1;

FIG. 3 is an enlarged cross-sectional view taken along line 3—3 of FIG. 2;

DETAILED DESCRIPTION OF A PREFERRED EMBODIMENT

Figure 4:
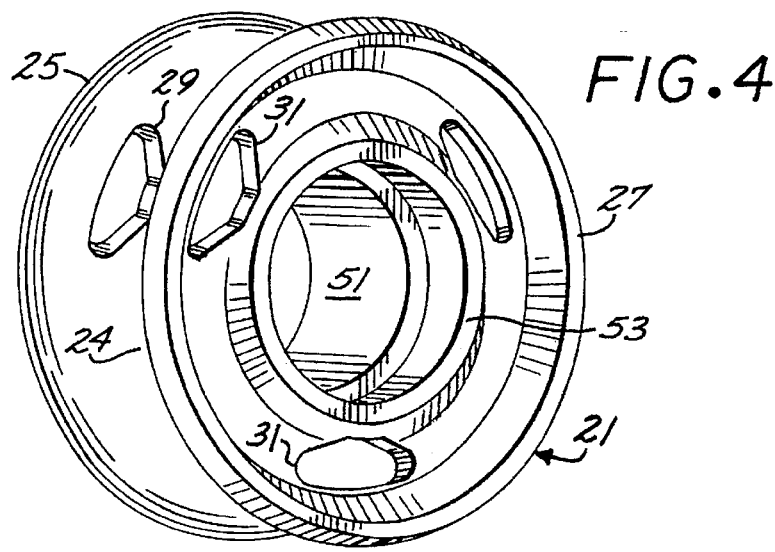
FIG. 4 is a perspective view, in enlarged scale, of a hub incorporated in the skate wheel shown in FIG. 1.

The pre-pressurized in-line roller skate wheel of the present invention includes, generally, a hard polyurethane hub 21 formed with a drop center 24 having opposed radial flanges 25 and 27 angling axially outwardly. The flanges 25 and 27 are formed with axially projecting and axially aligned through windows 29 and 31, respectively, configured with a generally triangular cross sections and spaced 120° apart. An annular bladder device, generally designated 35, is constructed of soft polyurethane and configured with three axially elongated, pressurized bladder rods, generally designated 33, spaced 120° apart and configured to be received on their axial opposite extremities in the respective windows 29 and 31. Radiating outwardly from the respective bladder rods 33 are respective radial webs 41 (FIG. 3) which mount at their radially outer extremities a pressurized annular tube 43. Formed about the bladder device 35 and bonded to the drop center 24 is a soft polyurethane tire body, generally designated 45, configured with an arcuate or generally oval shaped tread surface 47.

The sport of in-line skating has developed to the point where even the recreational skater puts great demands on the structure of the wheel. In-line skates are utilized in recreational outings to skate over a wide variety of surfaces, both smooth and of an irregular, uneven nature. At high speeds the wheels are subjected to substantial vibration when traveling across uneven surfaces and when encountering sharp changes in surface contour, and during turning maneuvers, are subjected to substantial shock loads and lateral torque loads applied to the sides of the tire body. For the comfort and endurance of the skater, it is important that the vibrations be to some degree absorbed in the tire structure and, for safety purposes, that the tire structure present a reliable, long and trouble free life.

In the preferred embodiment, the wheel is constructed of a thermoset polyurethane with the hub 21 being constructed of a hard rigid thermo plastic polyurethane on the order of a 75A durometer to exhibit good load support and the tube 35 and wheel 45 being constructed of a relatively soft polyurethane on the order of 60A and 70A durometer, respectively. The hub 21 is constructed with a through axial bore, generally designated 51, having enlarged-in-diameter bearing glands 53 at the opposite axial ends thereof. The hub is formed with the flanges 25 and 27 defining at the radially outer extremity thereof rounded beads 55 and 57.

respectively, for cooperating in carrying the loads applied to the axle to be transmitted through the bladder and wheel to the underlying support surface. The drop center 24 is formed with a central annular, wide groove 59 configured to project about the periphery of the interior of the drop center to define a space extending thereabout radially interior of the respective outer rods 33.

Figure 5:
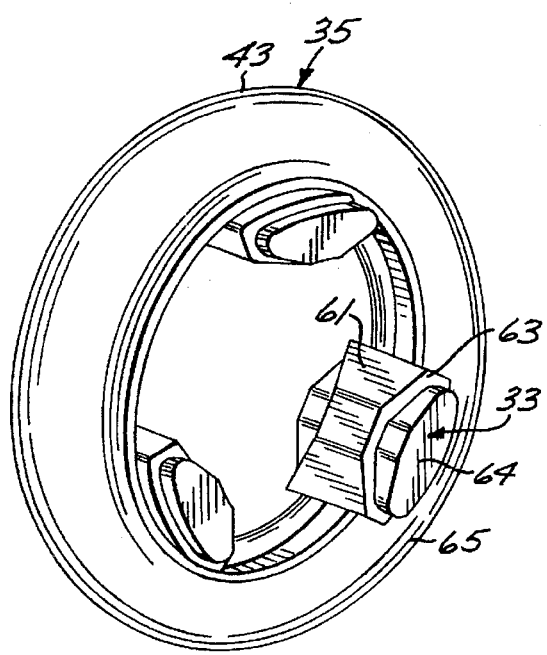
FIG. 5 is a perspective view, in enlarged scale, of a pre-pressurized bladder device included in the wheel shown in FIG. 1.
Figure 6:
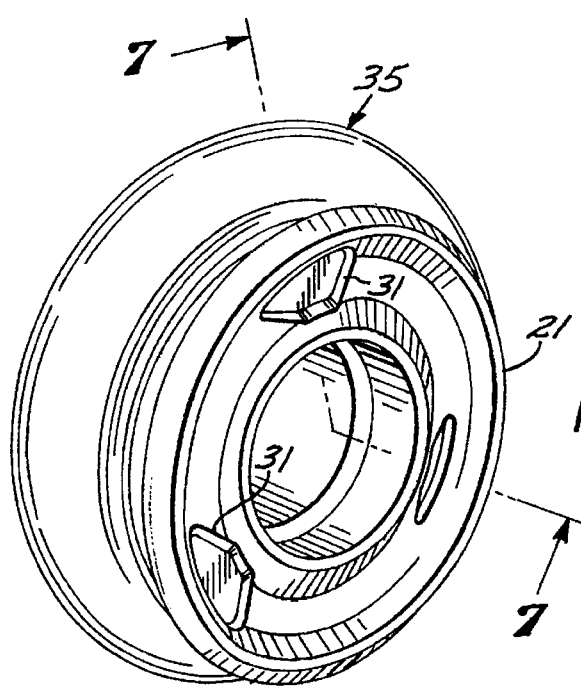
FIG. 6 is a perspective view, in enlarged scale, of a hub and bladder device incorporated in the skate wheel shown in FIG. 1.

Referring to FIG. 5, the respective bladder device may be constructed of soft urethane having a 60A durometer. The rods 33 are hollow to be formed with respective interior chambers 34 and configured in radial cross section to form somewhat rectangular central bodies 61 and are then reduced in cross section at their opposite axial ends to form respective parametrical, axially outwardly facing, radially and axially inwardly angling shoulders 63 configured to complement the contour of the axially inner surfaces of the respective flanges 25 and 27. Projecting axially outwardly in the opposite directions from such bodies are respective reduced in cross section plugs 65 having a somewhat triangular shape to complement the cross sectional configuration of the respective windows 29 and 31. In this manner, the respective shoulders 63 abut the interior edges of the respective windows 29 and 31 (FIG. 3) with the respective plugs 65 complementally projecting into such windows to plug the windows against flow of molten thermoset polyurethane during forming of the body 45.

The respective radial webs 41 are formed with sufficient column strength to stand the annular tube 43 off from the respective bladder rods 33 to maintain such tube spaced radially from the drop center and in a generally circular concentric configuration with respect to the drop center during the molding process. The tube 43 is of integral construction with openings to maintain the fluid trapped therein sealed against escape during operation of the wheel. In one embodiment, it is circular in cross section to define a pressure chamber 46. The bladder rods 33 and tube 43 may be pre-pressurized with selected different fluids and, in one embodiment, are pressurized with argon gas and in another embodiment with ambient air.

The tire body 45 is formed of soft polyurethane on the order of 60A durometer and is configured to define a central annular rib 71 projecting radially inwardly within the drop center and configured to flow about and encase the major periphery of the respective bladder rods 33 and to form within the central groove 59 an annular drop center endless constraining ring 73.

Typically in-line skate wheels have an outside diameter of about 7.5 cm and, in one embodiment, the diameter of the radially inner wall of the drop center of the hub 21 is 3.8 cm. The bladder tube 43 has an outside diameter of about 6 cm, an outside cross sectional diameter of about 1.5 cm, and a wall thickness of about 0.1 cm. The radial thickness of the tire body is about 2 cm and the radial distal tire wall may be of any selected thickness to provide the desired degree of cushioning. In a typical construction, the wall is about 0.7 cm thick radially distal of the tube to provide the desired level of cushioning while leaving sufficient volume within the tube and chamber 46 for encapsulating a sufficient volume of compressible gas to maintain the compressibility necessary for cooperation with the tire body to provide the desired cushioning and shock absorbing characteristics.

The molding process for the bladder device takes advantage of Boyle's Law which allows for internal pressure within the pressurization compartments of the bladder device 35 to, as dictated by Boyle's Law [$p \equiv 1/v$ (p=pressure, v=volume)].

Referring to FIGS. 7–10, in the manufacture of the bladder device 35 complementary mold bodies, generally designated 81 and 83, are provided with confronting open ended, circular slide grooves 85 and 87, respectively, which telescopically receive respective slide damp rings 89 and 91. The respective slide clamp rings 89 and 91 are biased to respective extended positions from the respective faces of the die bodies 81 and 83 by means of respective biasing springs 97 and 99 nested in the respective slide grooves 85 and 87. The mold bodies 81 and 83 are formed on their confronting sides with respective cavities 93 and 95 defining the exterior outline of the bladder device.

The mold cavities 93 and 95 may be formed in the periphery thereof with the semicylindrical cavities configured to form the inner tube 43 with small beebee like indentations disposed in spaced relation about the periphery thereof to form the wear bumps 44 (FIG. 3).

Figure 7:
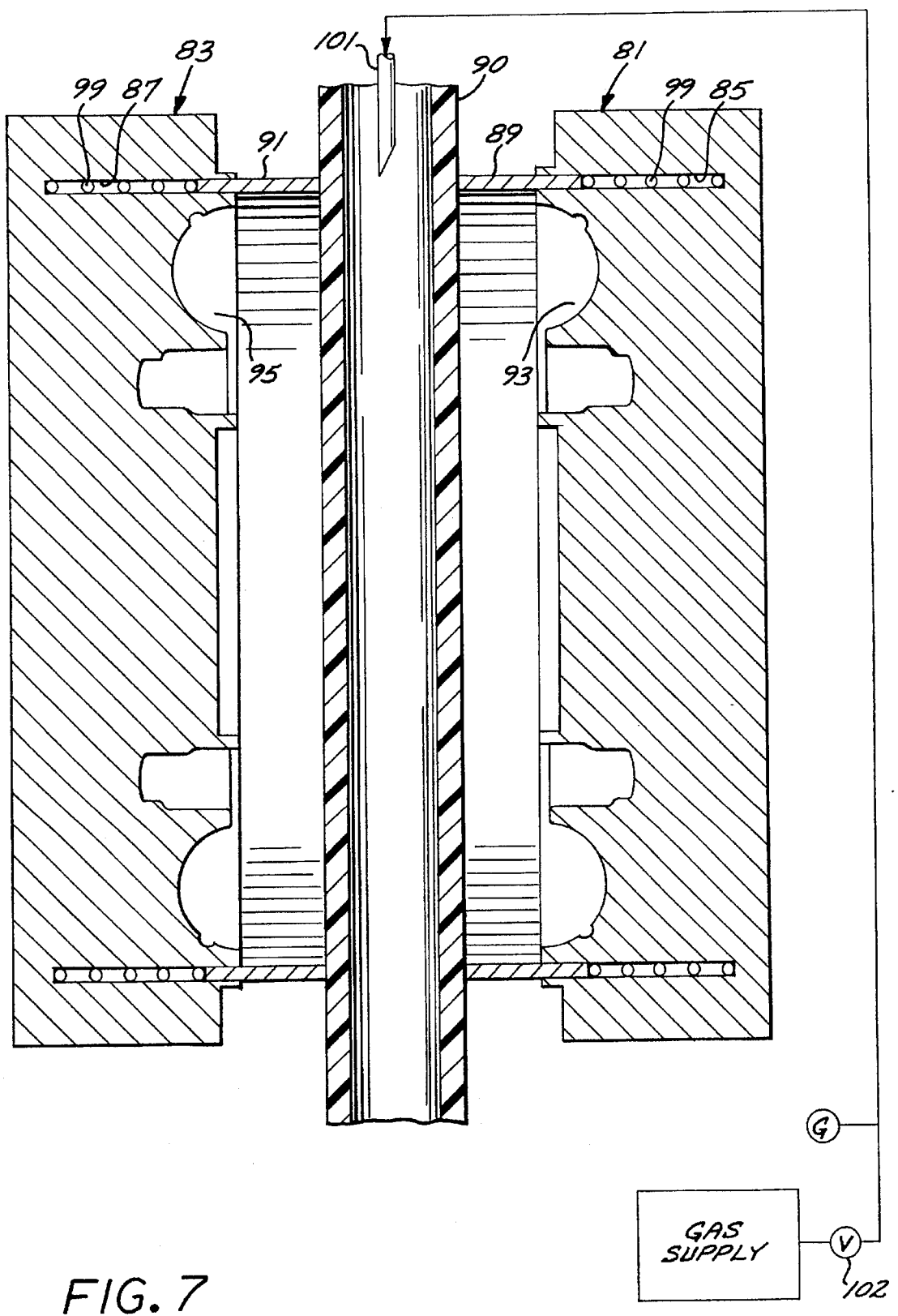
FIGS. 7–10 are angular cross-sectional views, in enlarged scale, taken through the cavities for the bladder in a blow mold for making the bladder device incorporated in the tire shown in FIGS. 1 and 3 and showing the mold in open, partially closed, initial pressurization and closed positions, respectively.

An injection die (not shown) may be actuated to inject a paste-like, double walled tube strip of polyurethane material to form a tubular parison 90, advanced downwardly between the confronting edges of the retracted tubular clamps 89 and 91, as shown in FIG. 7. A pressurized needle 101 may be advanced downwardly into place for initially blowing gas into the blank 90.

Figure 8:
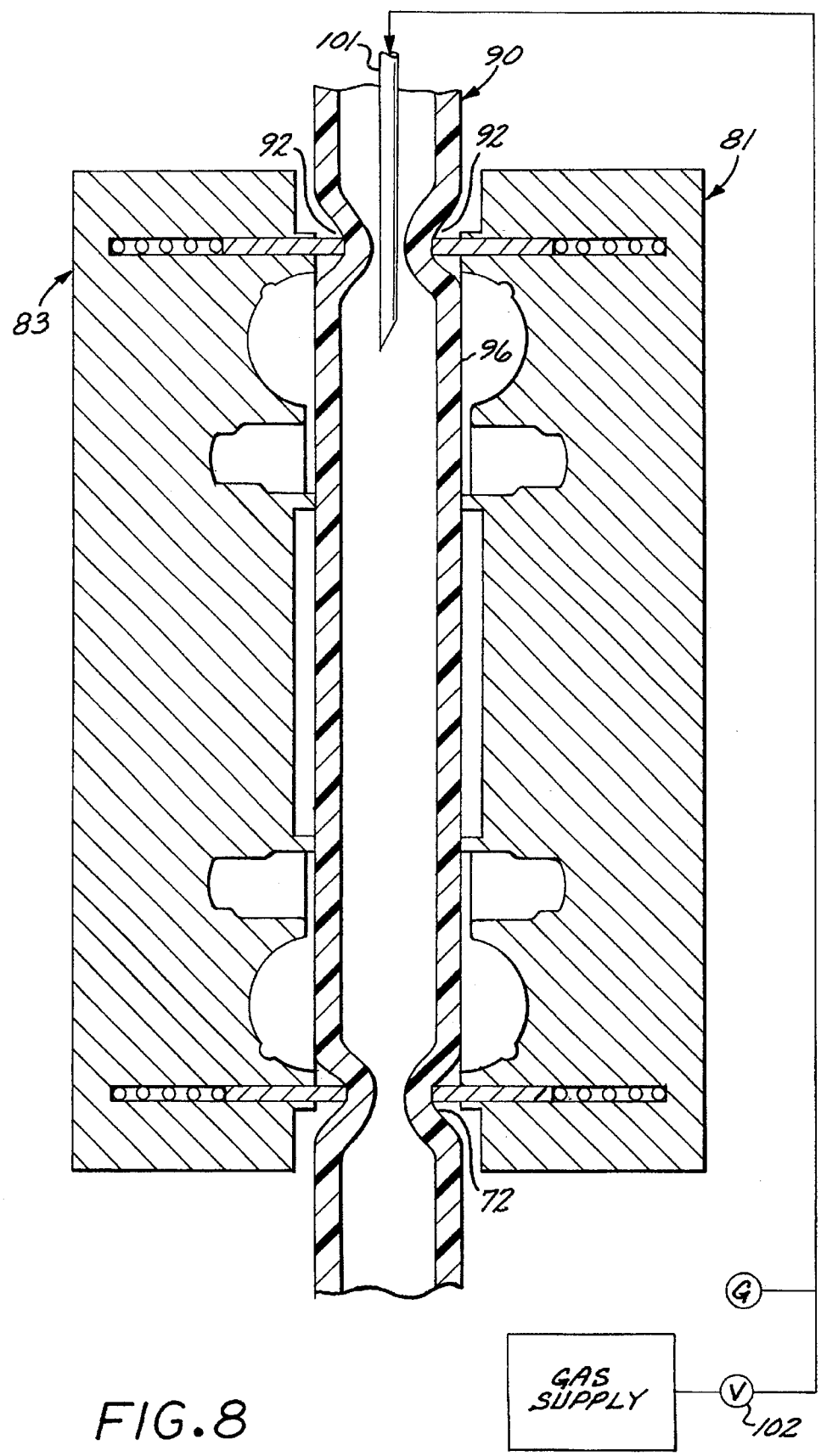

The mold halves 81 and 83 may then be advanced by their supporting hydraulic cylinders to the position shown in FIG. 8 to engage the confronting edges of the tubular clamps 89 and 91 with the opposite sides of the blank 90 to flex the opposite walls thereof inwardly toward one another to flatten such blank somewhat to define a lateral dimension slightly greater than the major diameter of the cavities 93 and 95 and define creases 92 in the opposite walls, as shown in FIG. 8, to establish therebetween on the diametrically opposite sides of such clamps reduced-in-cross section throats to restrict gas flow from the interior of the volume defined between such opposite diametrical edge sections of the clamps.

Figure 9:
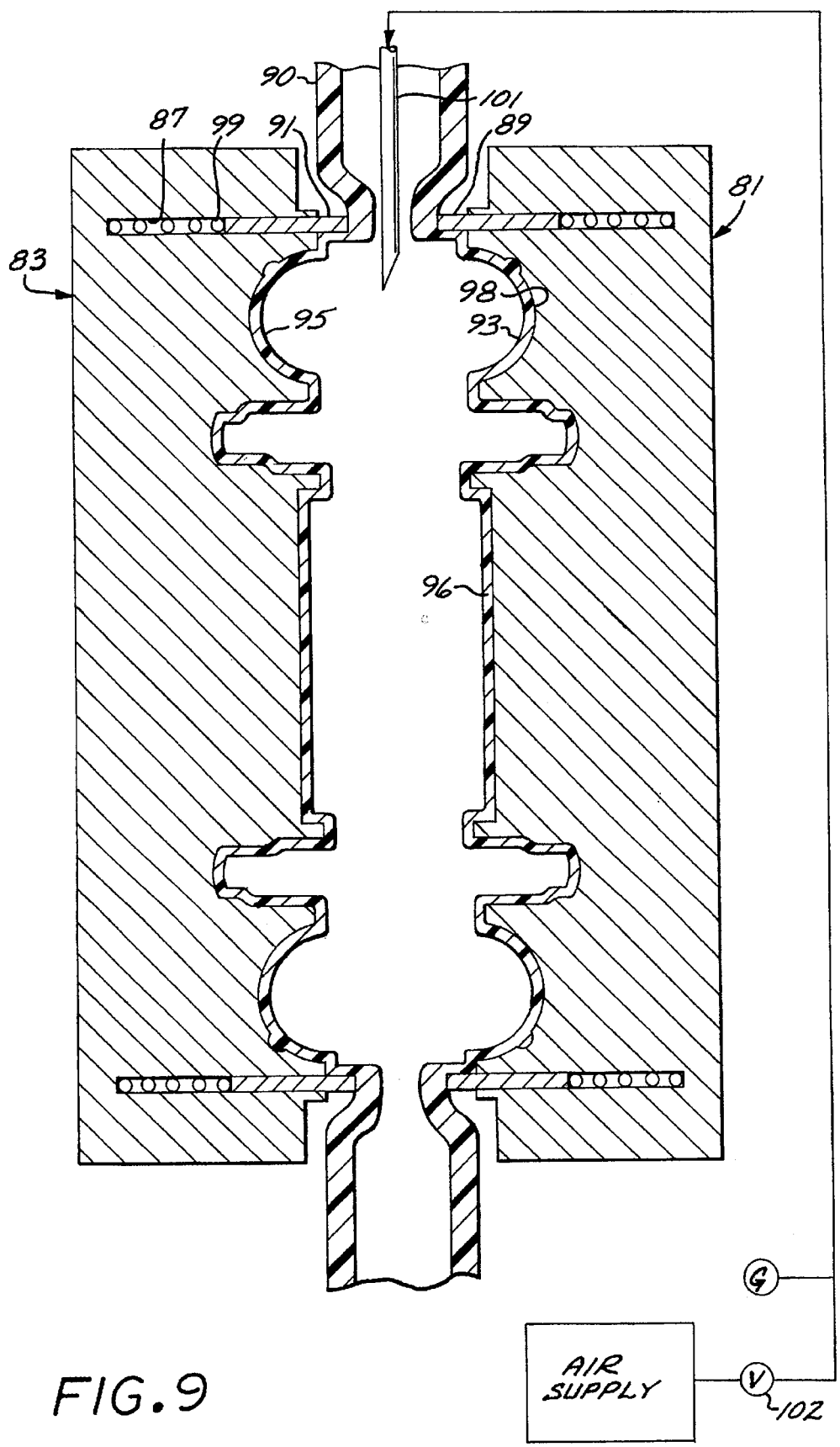
Figure 10:
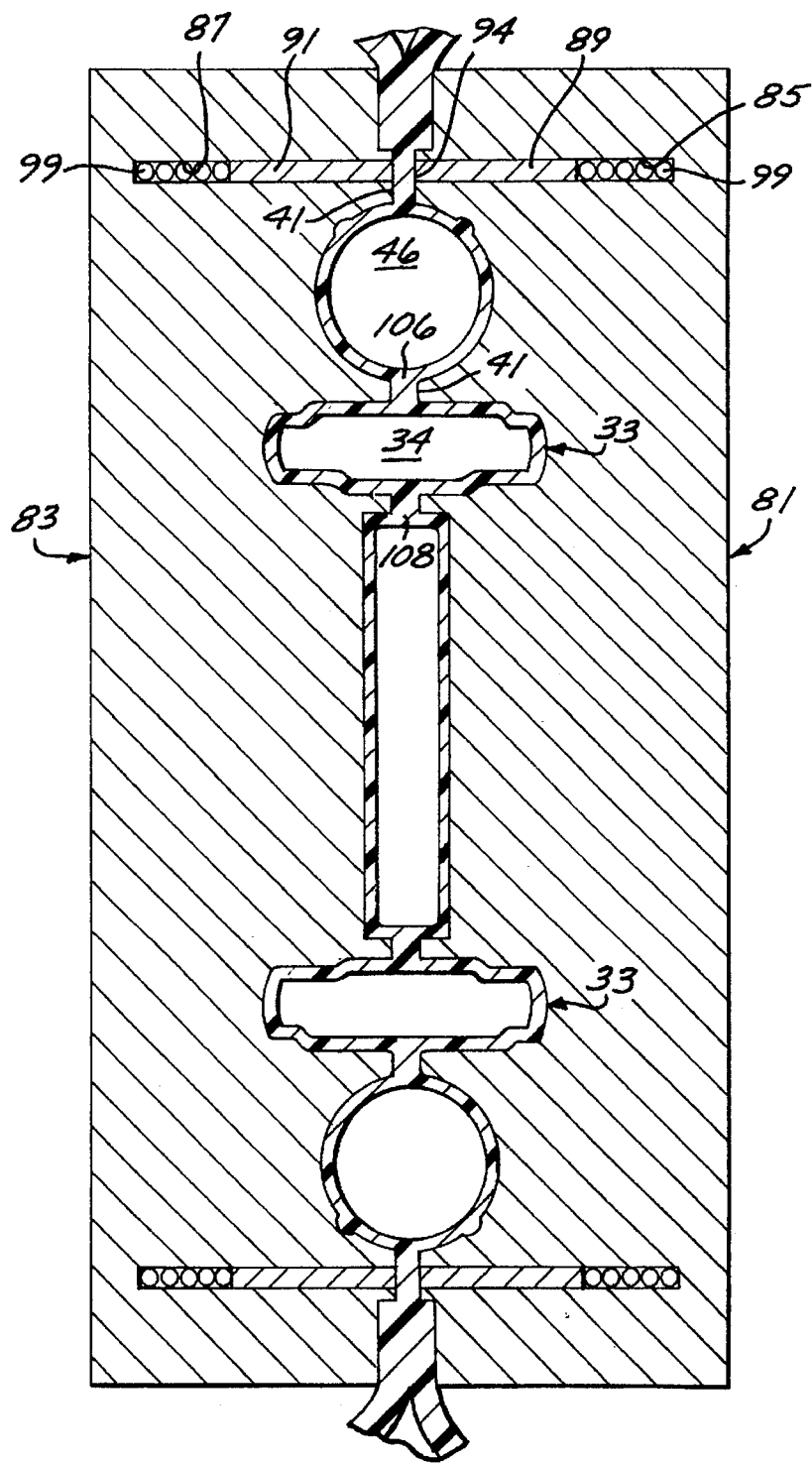
Figure 11:
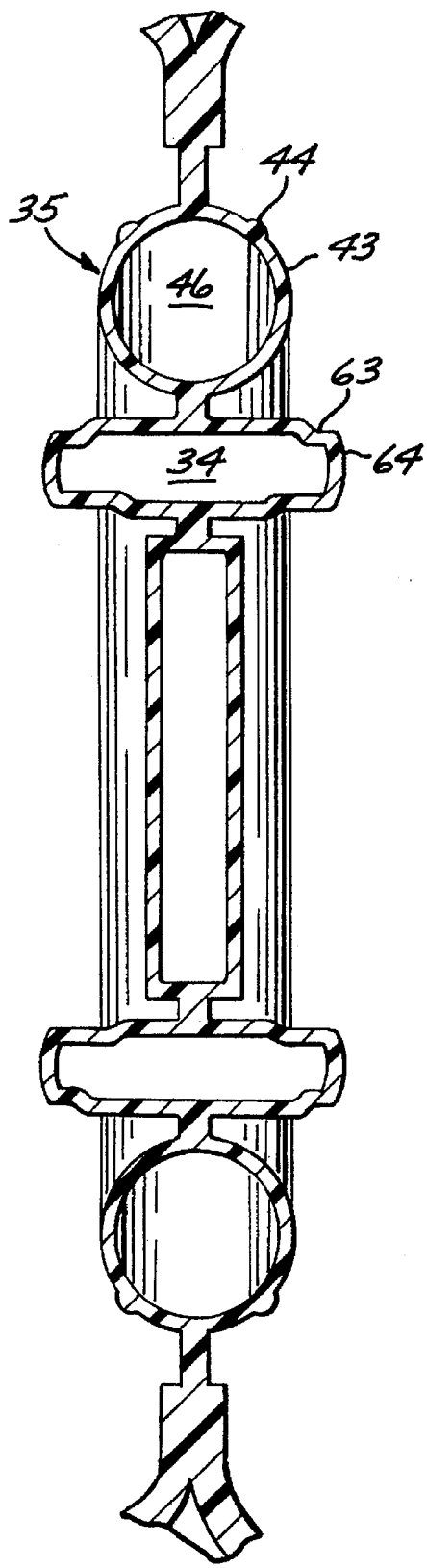
FIG. 11 is a cross-sectional view of the bladder device contained in the mold shown in FIG. 10 but in its untrimmed state.
Figure 12:
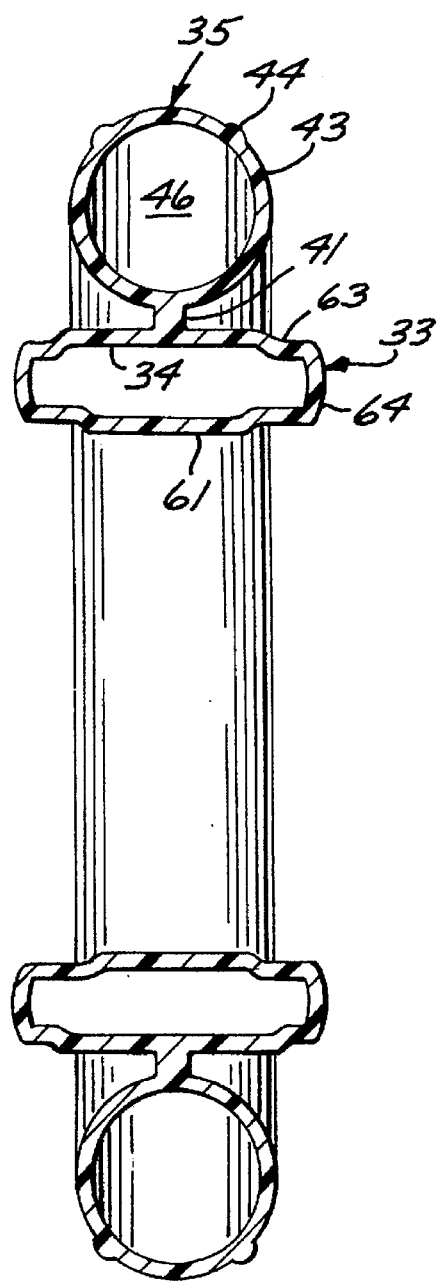
FIG. 12 is a cross-sectional view of the bladder device shown in FIG. 11 but after it has been trimmed.

A control valve 102 may then be opened to apply gas at a rate which will allow for a pressure build up in the volume between the creases 92 to thus blow the wall of the blank 90 outwardly to line the contour of the mold cavities 93 and 95 with a liner wall 96 (FIG. 9). The needle 101 may then be retracted and the mold halves 81 and 83 advanced to press the creases 92 together to close the opposite walls on one another to form a peripheral seal 94 and trap the residual gas within the confines of the blown liner wall 96. The mold halves are then further advanced toward one another collapsing the spring clamps 89 and 91 in their respective grooves to the position shown in FIG. 10, and to press the walls of such blank together along the seam lines 106 and 108 to seal the pressure chambers 46 and 34 separate from each other to capture the compressed gas. The polyurethane can then be allowed to cool to take the configuration of the resultant bladder device with the desired configuration shown in FIG. 11. The cooled bladder device may then be removed from the mold and trimmed to remove the waste zones and provide the configuration shown in FIG. 12.

While the construction of the injection mold and die blank 90 may be configured in various configurations and the blank pressurized to the various different pressurization levels, it is understood that the bladder device should be pressurized to a degree sufficient to afford the desired pneumatic support while allowing for controlled shock absorption. Care must also be taken to avoid over pressurization to the degree where the formed bladder device shown in FIG. 12 would, upon being released from the mold, be over extended and lose the desired shape. It has been found that a pressure between 10 and 25 psi is desirable and, in one embodiment, a pressure of 20 psi has been found satisfactory for the wheel of the subject invention.

Figure 13:
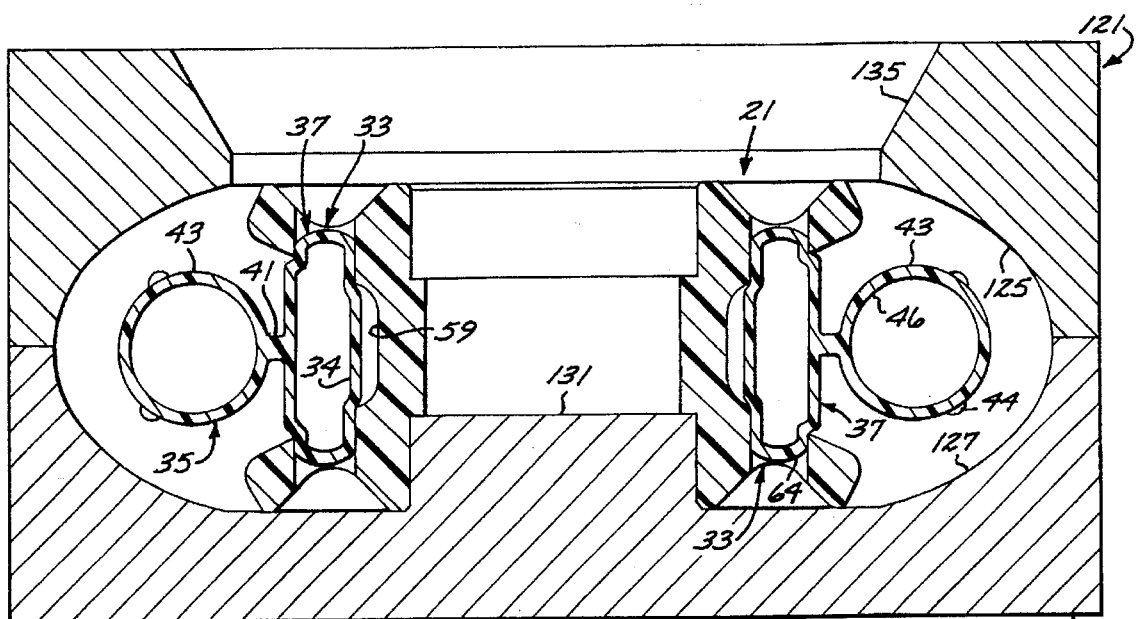
FIG. 13 is a cross-sectional view, in enlarged scale, of the hub and bladder device shown in FIG. 6, nested in a mold during the manufacturing process.
Figure 14:
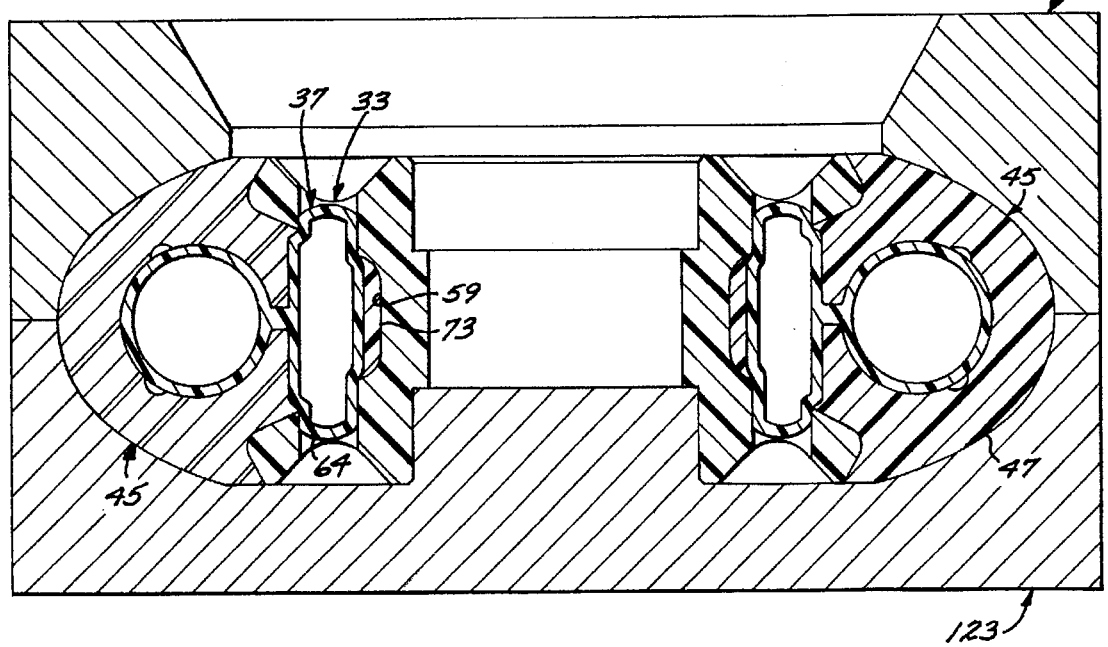
FIG. 14 is a cross-sectional view, similar to FIG. 13, after the introduction of urethane to form the tire body.

Referring to FIGS. 13 and 14, the tire itself may be molded in a tire mold made up of mold halves, generally designated 121 and 123. The mold halves 121 and 123 are formed with respective confronting ellipsoidal cavities 125 and 127 configured to complementally form the opposite halves of the overall wheel configuration. The cavities 125 and 127 and molding process for the wheel is similar to that shown in U.S. patent application Ser. No. 08/354,374, filed Jan. 12, 1994. The mold half 121 is formed with an upwardly opening frusto conical gate 135 and the lower half 123 with a central upstanding centering post 131 for nesting a bearing gland of the hub 21.

In practice, the operator will select a hub 21 and will insert the preformed blow molded tube device thereon by manipulating the respective bladder rods 33 and tube 43 over one flange 25 or 27 to be nested in the drop center in alignment with the respective flange windows 29 and 31. The bladder rods 33 are manipulated into position such that the respective plugs 65 are received in the axially interior extremity of the respective windows 29 and 31 with the respective sealing shoulders 63 abutted against the window edges, as shown in FIG. 3. This will then serve to register the respective bladder rods with the respective windows and the inflated rods will act through the column strength of the respective stand off webs 41 (FIG. 3) to hold the bladder device 35 securely in place with the annular tube 43 stood off from the drop center to be held in concentric spaced relation with respect to the drop center for subsequent pouring of the tire body. It will be appreciated by those skilled in the art that the windows 29 and 31 in some embodiments of the present invention may be outwardly recessed indentations in the respective flanges 25 and 27 or, as in the preferred embodiment, are in the form of through openings so the opposite end walls 64 of the plugs 65 may be viewed from the exterior of the wheel.

The hub 21 and assembled bladder device 35 are nested in the cavity 127 of the lower mold half 123 registered on the index post 131 and the upper mold half 121 closed thereon as shown. A charge of polyurethane may then be introduced through the mold access opening 135 to fill the combined cavities with the polyurethane to form the tire body 45 as shown in FIG. 14. The resultant tire body will then be configured with an elliptical tread surface 47 extending about the exterior periphery and the body will fully envelop the entire periphery of the annular tube 43 and bond thereto thereby forming an essentially integral encapsulation of the air chamber 46 to define a discrete chamber, the combined wall of which is essentially impermeable to leakage of the pressurization fluid and which cooperates to form an overall load carrying and shock absorption capability characterized by the combined resiliency of the tire body 45 and the compressibility and flow characteristics of the fluid within the chamber 46. Furthermore, the polyurethane defining the tire body 45 will flow about the contour of the respective flanges 25 and 27 and over the tire beads 55 and 57 to cooperate therewith in forming a high integrity bond to define a hub carrying structure mounted on the hub which is resistant to high impact loads and loading from numerous different directions to maintain a reliable load carrying structure.

Similarly, the polyurethane will flow downwardly and radially inwardly relative to the respective bladder rods 33 to form between such bladder rods annularly projecting polyurethane spokes and to further flow radially inwardly into the recessed groove 59 to thereby form a continuous annular constraining ring 73 extending entirely around the drop center radially interior of the respective outer rods 33 and cooperating with the remainder of the tire body to form an integral high integrity tire body cooperating with the overall composite structure of the bladder rods 33 and tube 43 to absorb shock and carry loads as described hereinbelow.

Of benefit is the fact that the bladder rod plugs 65 complementally fit the inner extremities of the respective windows 29 and 31 to thus block flow of the molten polyurethane from flowing out such windows and allowing a high integrity bond to be established between the plugs and shoulder 63 and the confronting peripheral edges of such windows (FIG. 3).

In operation, it will be appreciated that when a set of wheels of the present invention are mounted in line on the axles of a skate frame, the skater can glide on such wheels placing his or her weight directly over the wheels and may maneuver about leaning right or left and applying centrifugal force to the wheels as the skater maneuvers through various intricate maneuvers, including long sweeping skate strokes or turns along gradual radii or sharp turns or even quick stops and jumps. As the skate wheel rolls along the underlying surface, it will be appreciated that various different underlying surface ungulations and sharp ledges or peddles or cracks and the like may be encountered thus applying shock loads to the wheel. It will be appreciated that such shock loads may flex the body of the tire radially inwardly to a degree dictated by the resiliency of the body of the tire 45 and the ability of such tire body to flex and essentially flow forwardly or rearwardly of the tangential contact point. The force pattern set up in the tire will be dictated by the overall load on the tire by the ability of the tire body to flex and flow radially inwardly for even slight tangential to the radial line between the axle and contact point. As the bladder rods 33 orbit through the rotation of the wheel, the cavity defined by the respective chambers 34 will be available to accommodate radial inwardly flexing of the tire body to thereby also cooperate in absorbing the shock load. The bonding of the tire body to the interior of the drop flange center and encapsulation of the tube and bladder rods serves to facilitate the carrying of side loads and centrifugal forces.

It will be appreciated that should one or more of the bladder rods spring a leak and lose their pressurization, the overall performance of the wheel will be deteriorated. However, because of the fact that each such bladder rod 33 and the annular tube 43 form discrete chambers 46 and 34, respectively, the leakage of one chamber will not significantly affect the performance or integrity of another chamber. Consequently, the skater, even with a deterioration in performance attendant leakage in one of the rods 33, will be able to rely on the overall load carrying performance of the skate wheel to make, for instance, a return trip to his or her residence. In the event a skater detects a deteriorating performance in a wheel, it is possible for the skater to lift his or her foot to observe the respective end wall 64 of the particular bladders to thereby gain an impression of whether or not that bladder has maintained its pressurization. This impression may then be confirmed by inserting a small instrument, such as the end of a ball point pen or key, within the particular window 29 or 31 to contact the end wall 64 of the suspected bladder rod 33 to confirm or deny the suspension of malfunction.

From the foregoing, it will be clear that the skate wheel apparatus of the present invention provides a relatively smooth riding, highly durable wheel construction which affords advantages not available in prior wheels. The construction of the wheel of the present invention allows for a method of manufacture which is efficient and convenient to employ in most injection and molding manufacturing plants. The resultant construction incorporates a structure which is particularly adaptable for convenient and quick observation of the bladder rod to detect any malfunctioning.

What is claimed is:

1. An in-line shock absorbing pre-pressurized skate wheel comprising:

a hard urethane hub formed with a drop center and radially projecting axially spaced apart flanges, said flanges being formed interiorly with a predetermined number of angularly spaced apart axial openings;

a tube pressurized with compressible gas disposed concentrically about said hub;

a predetermined number of compressible bladder rods interposed between said tube and said hub and formed with respective oppositely disposed axial ends received in the respective said openings;

respective webs connecting the said bladder rods to said tube; and a relatively soft urethane tire body formed between said flanges, surrounding said tube and at least a portion of the respective bladder rods, said tire body projecting partially outwardly from said flanges to be further formed with an arcuate tread surface.

2. An in-line skate wheel as set forth in claim 1 wherein: said openings project axially through respective flanges to form windows.

3. An in-line skate wheel as set forth in claim 1 wherein: said bladder rods are formed at their respective opposite axial extremities with reduced in diameter projections projecting into the respective openings.

4. An in-line Skate wheel as set forth in claim 3 wherein: said bladder rods are formed with respective axially outwardly facing sealing shoulders sealed against the axially inner edges of the respective said openings.

5. An in-line skate wheel as set forth in claim 1 wherein: said tube and bladder rods are formed with respective discrete pressure chambers.

6. An in-line skate wheel as set forth in claim 1 wherein: said tube is formed with a continuous wall.

7. An in-line skate wheel as set forth in claim 1 wherein: said bladder rods are formed with respective continuous walls.

8. An in-line skate wheel as set forth in claim 1 wherein: said hub is formed with an annular wall configured with a radially inwardly recessed annular groove; and said tire body is formed with an annular ring imbedded in said annular groove.

9. An in-line skate wheel as set forth in claim 2 wherein: the respective bladder rods are formed at their axially opposite ends with respective bladder end walls viewable from the axial exterior of said windows.

10. An in-line skate wheel as set forth in claim 1 wherein: said hub is formed with a radially inwardly disposed drop center wall; and said bladder rods are configured to nest on their respective radially inner sides on said drop center wall.

11. An in-line skate wheel as set forth in claim 1 wherein: said tire body is bonded to the interior surfaces of the respective said flanges and to the peripheral surfaces of said tube and bladder rods.

12. An in-line skate wheel as set forth in claim 1 wherein: said compressible gas pressurizing said tube is air.

13. An in-line skate wheel as set forth in claim 1 wherein: said bladder rods are formed with discrete hollow chambers and include a compressible gas in said chambers.

14. An in-line skate wheel as set forth in claim 1 wherein: said tire body is formed with a tread wall radially distal of said tube formed with a thickness of at least 0.7 cm.

15. An in-line skate wheel as set forth in claim 1 wherein: said tube includes a plurality of wear bumps projecting from the exterior of the wall thereof.

16. An in-line skate wheel as set forth in claim 1 wherein: said tube is pressurized to substantially 15 psi.

17. An in-line skate wheel as set forth in claim 1 wherein: said tube is pressurized to at least 10 psi.

18. An in-line shock absorbing skate wheel comprising:

a hard urethane hub formed with a drop center having a radially inner annular wall and radially projecting axially spaced apart flanges;

a soft urethane bladder device including a plurality of radially projecting spacer rods disposed equidistant about said annular wall and an annular tube carried at the radially outer ends of the respective said rods;

a soft urethane tire body formed with a radially inwardly projecting rib received in said drop center and bonded to said flanges, said tire body encapsulating said tube and being bonded thereto and formed radially distally of said tube with an annular wall defining a polyurethane cushion configured with an elliptically shaped annular tread surface for cushioning shock loads applied radially inwardly to said tire; and a compressible gas charge in said tube whereby said annular cushion and pressurized tube will cooperate to withstand loads applied to said tread wall during operation at high speed over uneven terrain to cushion and absorb at least some of the consequent shock loads.

* * * * *